United States Patent [19]

Le Rouzo

[11] 4,402,646

[45] Sep. 6, 1983

[54] STABILIZATION SYSTEM FOR A PANTOGRAPHIC DATA ENTRY DEVICE

[75] Inventor: Jean Le Rouzo, Paris, France

[73] Assignee: Regie Nationale des Usines Renault, Billancourt-Boulogne, France

[21] Appl. No.: 230,676

[22] Filed: Feb. 2, 1981

[30] Foreign Application Priority Data

Feb. 5, 1980 [FR] France .................. 80 02428

[51] Int. Cl.³ .............................................. B25J 9/00
[52] U.S. Cl. ................................. 414/719; 414/738; 248/123.1; 248/280.1
[58] Field of Search .................. 414/2, 719, 723; 248/280.1, 123.1; 128/303.1

[56] References Cited

U.S. PATENT DOCUMENTS

| 3,073,343 | 1/1963 | Mowell et al. | ............ 248/280.1 X |
| 4,241,891 | 12/1980 | Rudolph | .......................... 248/123.1 |
| 4,300,198 | 11/1981 | Davini | .......................... 414/719 X |

FOREIGN PATENT DOCUMENTS

| 1046608 | 12/1953 | France . |
| 1138902 | 6/1957 | France . |
| 1394029 | 3/1966 | France . |
| 2061941 | 6/1971 | France . |

*Primary Examiner*—Robert J. Spar
*Assistant Examiner*—Terrance L. Siemens
*Attorney, Agent, or Firm*—Oblon, Fisher, Spivak, McClelland & Maier

[57] ABSTRACT

Disclosed is a stabilization system for an apprentice pantographic data entry device having at least six pivot axes of rotation. The stabilization system is formed of a plurality of pivoted linkages forming at least one parallelogram which support weights counterbalancing the arms of apprentice pantographic data entry device. The linkages and a series of pulleys rotate the counterweights in response to the movement of the arms. In a first embodiment, a pair of parallelograms are symmetrically disposed about the first arm. In a second embodiment, a single parallelogram is disposed on one side of the arms. In a third embodiment, a single parallelogram is disposed in a plane defined by the first and second arms.

11 Claims, 3 Drawing Figures

STABILIZATION SYSTEM FOR A PANTOGRAPHIC DATA ENTRY DEVICE

BACKGROUND OF THE INVENTION

1. Field of the Invention

The present invention relates to a stabilization system for apprentice robots.

2. Description of the Prior Art

The use of robots to achieve a high quality paint finish on large objects, such as automobile bodies, has been known for some time. However, if one wants the robot to be able to blend the primary coat, the ornamented and interior surfaces of the body in a satisfactory manner, such paint application presents many problems.

One must begin by defining a paint application trajectory which is continuous and which results in a uniformly thick coat without runs and "drips" and the recording of the trajectory must be continuous. The successive positions and stroke speed at each point are important and must be recorded in order to later permit the painting robot to automatically reproduce the desired trajectory with all its characteristics. Only then may one proceed to the data entry phase or apprenticeship.

In direct data entry, the operator "holds the robot's hand" and guides it along the trajectory. Although such a method is practical in the case of small robots, it rapidly becomes less practical as the robot gets larger because of greater inertia and inevitably greater friction. When the robot's manipulation is rapid and powerful, direct handling even presents a real danger to the operator.

A method for replacing the robot with a pnatographic data entry device for the entry phase and for the recording of the trajectories is known. The construction of the P.D.E.D. duplicates the geometry of the robot in a lightweight structure. In spite of the light weight of the structure, its stabilization or balancing becomes indispensable to relieve the pressure on the operator responsible for the maneuvering of the P.D.E.D.

In the case of P.D.E.D. with six pivot axes, experience has shown that stabilization reached with the aid of counterweights and a compensating spring sufficiently lightens the P.D.E.D.

In the case of a paint application trajectory on an automobile body for which one wishes to successively coat the exterior, and then the interior, experience has shown that one must use a robot which has seven pivot axes. The stabilization of the corresponding P.D.E.D. with seven pivot axes is singularly complicated.

SUMMARY OF THE INVENTION

The object of the present invention is precisely to resolve the stabilization problem in a robot with six or more pivot axes.

According to the invention, the stabilization system is for a P.D.E.D. having at least six pivot axes including a first vertical axis, a second horizontal axis, a first arm pivoting at one of its extremities in a vertical plane at the intersection of the first and second pivot axes and which supports a third horizontal pivot axis at its other extremity, a second arm which pivots at one of its extremities in the same vertical plane around the point common to the first arm and the third axis and which supports a fourth pivot axis at its second extremity, a third arm moving in a plane perpendicular to the plane defined by the second arm and the fourth axis, the third arm rotating at one extremity around the common point for the second and third arm. The third arm supports an aspirator at its second extremity. In making use of counterweights for stabilization the stabilization of the P.D.E.D. is accomplished by a similar disposition of the P.D.E.D. structure relative to its second, third and fourth axes and to its first, second and third arms, respectively.

According to a first aspect of the invention, stabilization system is accomplished with a mechanical transmission system.

According to a second aspect of the invention, the stabilization system is divided and shifted to either side of the first axis.

According to a third aspect of the invention, the stabilization system is substantially located in a single plane.

According to a fourth aspect of the invention, the stabilization system is shifted to a single side of the first axis.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

The same reference numbers designate the same elements in the various figures.

Figure 1:
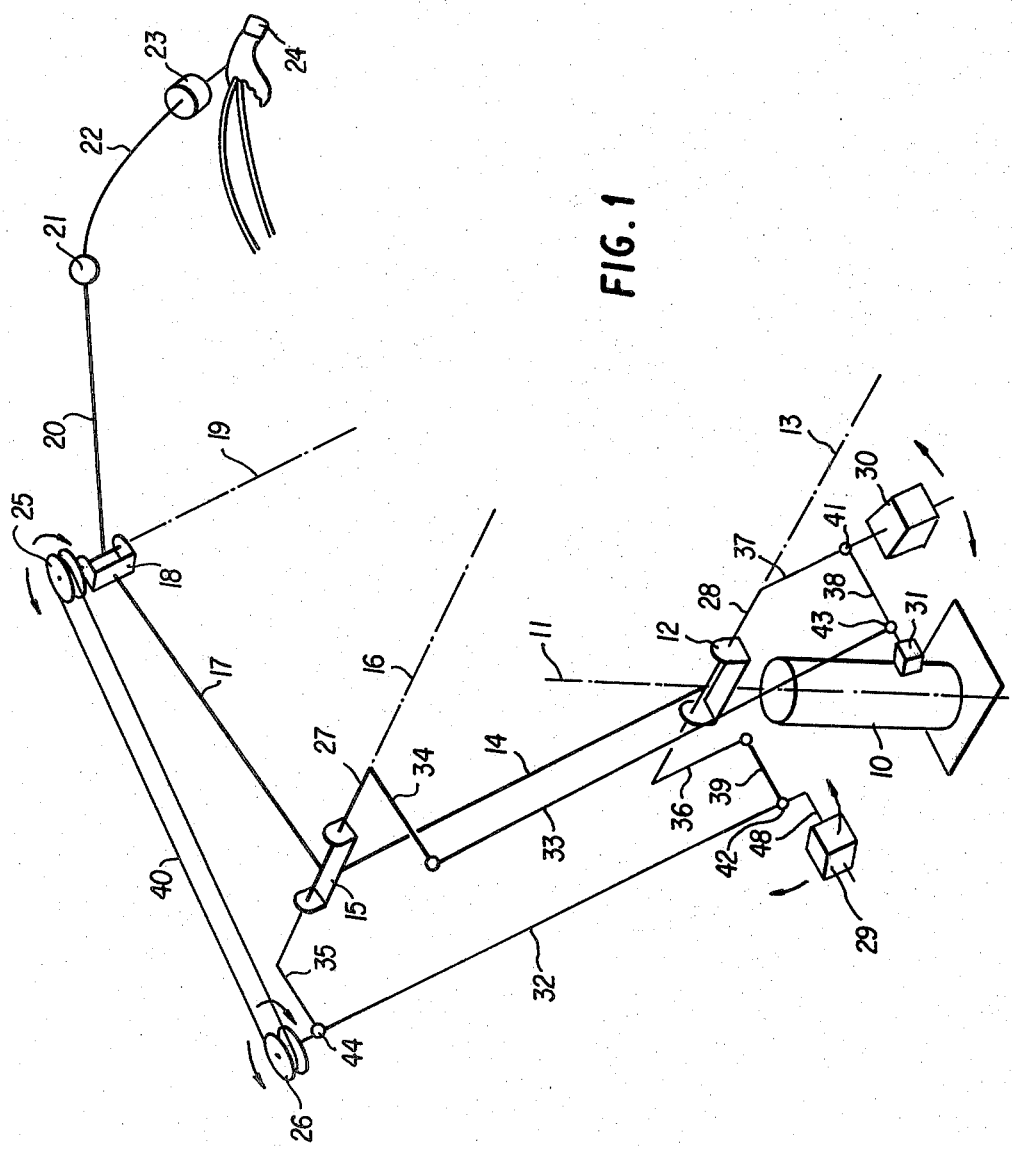
FIG. 1 represents an apprentice P.D.E.D equipped with a first embodiment of a stabilization system according to the present invention; namely, a stabilization system which is divided and shifted to either side of the primary axis of the P.D.E.D.

According to the embodiment illustrated in FIG. 1, the apprentice P.D.E.D. comprises rotation table 10 having vertical axis 11 as its first pivot axis. Arm 14 is a first arm and forearm 17 is a second arm, both of which are displaceable in a vertical plane. This assembly is articulated at pivots 12 and 15, having horizontal pivot axes 13 and 16, respectively. A third arm 20 moves in a plane perpendicular to the plane defined by arms 14 and 17, around pivot 18 which introduces a fourth pivot axis 19. At the extremity of arm 20 opposite pivot 18, the third arm 20 holds polyarticulated aspirator 22 including attachment part 21. The aspirator 22 is capable of sweeping a certain volume around this attachment part. This polyarticulated aspirator can be the type described in French patent application No. 77/02387 filed by the inventor on Jan. 23, 1977 for a "polyarticulated arm for a robot or automaton". The volume swept by the aspirator is defined by the fifth and sixth axes of the P.D.E.D. at the attachment part and the aspirator 22. At its extremity opposite attachment part 21, the aspirator supports a second attachment part 23, by which it is connected to a seventh axis, that of paint gun 24.

This P.D.E.D. structure is old and well-known. The present invention relates to a system which allows the masses or weights corresponding to the elements of the P.D.E.D. to be balanced, achieving stability for the assembly, thus reducing the fatigue of the operator who is manipulating gun 24 at the end of the P.D.E.D.

Rotation table 10 with its vertical axis 11 does not require stabilization. Aspirator 22 and gun 24, not a large influence, are treated together with third arm 20 and are estimated to correspond to a weight of $P_3$. According to the invention, weights $P_1$ corresponding to first arm 14, $P_2$ corresponding to second arm 17 and $P_3$, defined previously, are similarly balanced in relation to second axis 13. To this end and according to FIG. 1, first stirrup-piece 28 is positioned with its central portion along axis 13. This stirrup-piece 28 holds first lateral arm 37 parallel to arm 14 of the P.D.E.D. and, at its extremity supports weight 30 which corresponds to weight $P_1$ of arm 14. A second stirrup-piece 27 is positioned with its central portion along axis 16. It is interlocked with pivot 15 and its lateral arms 34 and 35 are in the plane defined by axis 16 and second arm 17. In the same way, first stirrup-piece 28 with its lateral arms 36 and 37 is in the plane defined by axis 13 and first arm 14 of the P.D.E.D. The free extremity of lateral arm 35 of second stirrup-piece 27 is connected in an articulated manner, by means of half-square 32, 39, to the free extremity of lateral arm 36 of first stirrup-piece 28. In an analogous way, the free extremity of lateral arm 34 of second stirrup-piece 27 is linked in an articulated manner, by means of half-square 33, 38, to lateral arm 37 of first stirrup-piece 28 at point 41 located toward the center of arm 37 in relation to the extremity which supports weight 30. Arm 39 of the first half-square is extended beyond articulation point 42 by arm 48 which supports at its free extremity weight 29 which corresponds to weight $P_3$, previously defined. In a similar manner, arm 38 of the second half-square extends beyond articulation point 43 and supports at its free extremity weight 31 which corresponds to weight $P_2$ of second arm 17 of the P.D.E.D. The assembly consisting of the two stirrup-pieces 27 and 28 and their lateral arms, and the two half-squares 32, 39 in one instance and 33, 38 in the other, form a symetrical system. Along axis 19 of pivot 18, on the exterior of the latter, first pulley 25 is mounted. Pulley 25 belongs to arm 20 and is attached to it. At the upper extremity of portions 32 of first half-square 32, 39, beyond point 44 where it is joined to lateral arm 35 of second stirrup-piece 27, a second pulley 26 is mounted. Pulleys 25 and 26, which are both in a plane parallel to the plane defined by second arm 17 and axis 16, are connected to each other by belt 40. Pulley 26 belongs to element 32 with which it interlocks during rotation.

Counterweight 30, the position of which is adjustable along extension 37 of arm 14 beyond horizontal axis 13, stabilizes the weight of arm 14 as well as the stress produced along axis 13 by weight 31 which corresponds to the weight of arm 17, when weight 31 is fitted to the structure.

Counterweight 31, the position of which is adjustable along element 38, stabilizes arm 17. Its movement in a plane parallel to the plane of movement of arm 17 is assured by partial parallelogram 34, 33, 38 and 37. Counterweight 31 is attached to rod 38 which is hinged at point 41 to extension 37 of arm 14.

Counterweight 29, the position of which is adjustable along extension 48, stabilizes all of arm 20, including aspirator 22 and gun 24. Its movement in a plane parallel to the plane of movement of arm 20 is assured by parallelogram 35, 32, 39, and 36. Pulley 25 interlocks with arm 20 during rotation and rotates couterweight 29 with it, through pulley 26, of the same diameter as pulley 25, swivelling in arm 17 and linked to axis 48 of counterweight 29 by shaft 32 and universal joints 44 and 42. Shaft 32 forms one of the sides of parallelogram 35, 32, 39 and 36.

Thanks to this stabilization system, whatever the position of the P.D.E.D. being manipulated by the operator of gun 24, the assembly is always stable, which greatly reduces the fatigue of the operator.

Figure 2:
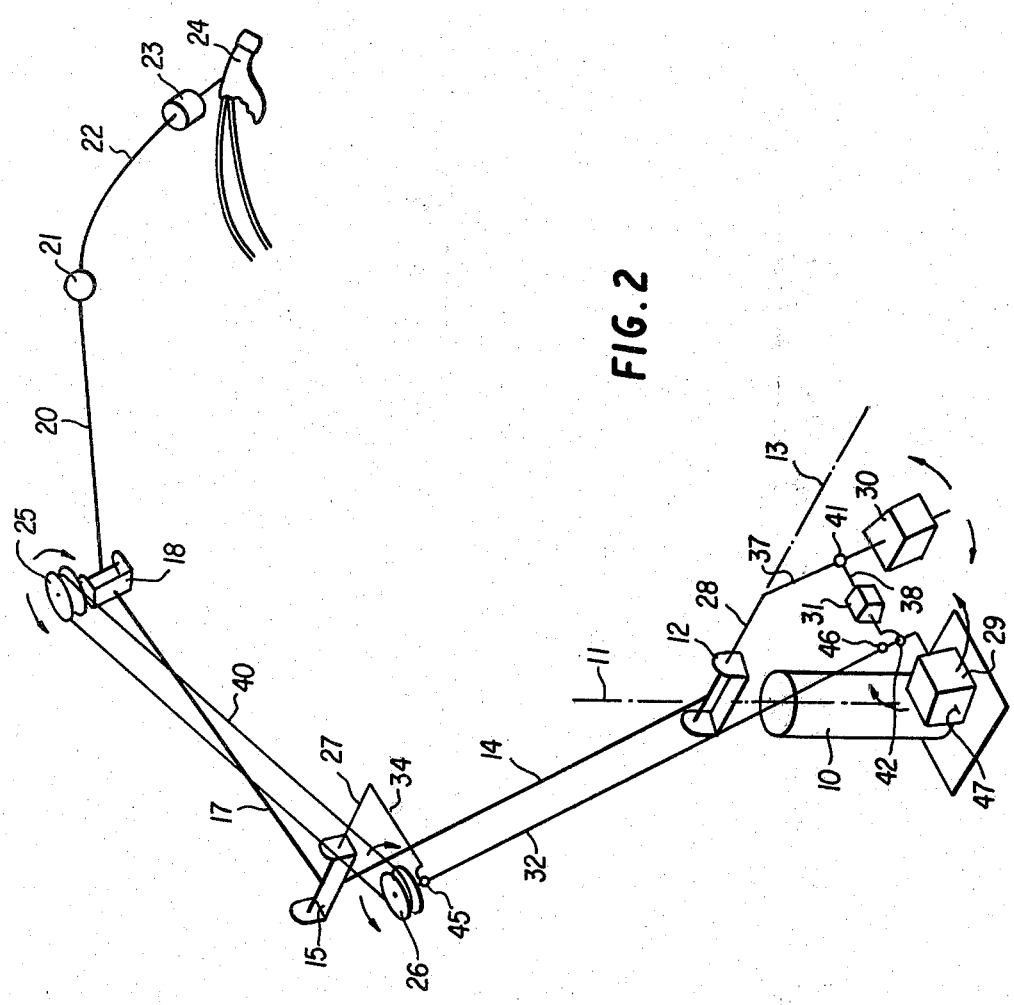
FIG. 2 represents an apprentice P.D.E.D. equipped with a second embodiment of a stabilization system according to the present invention; namely, a stabilization system which is shifted to a single side of the primary axis of the P.D.E.D.

FIG. 2 illustrates a second embodiment in which the stabilization apparatus is shifted to a single side of first axis 11 of the P.D.E.D. According to this embodiment, first stirrup-piece 28 now has only a single lateral arm 37 parallel to arm 14 of the P.D.E.D. Thus, there is only the single lateral partial parallelogram 37, 38, 32, 34. Counterweight 31 which stabilizes arm 17 has a position which is adjustable between its points of attachment 41 and 42 along rod 38. In this embodiment, pulley 25 interlocks during rotation with arm 20 and pulls along counterweight 29 through pulley 26, of the same diameter, swivelling in arm 17 and linked to axis 47 of counterweight 29 through shaft 32 and universal joints 45 and 46. Shaft 32 forms one of the sides of partial parallelogram 37, 38, 32, 34.

Shifting the balance or stabilization element, to one of the sides of first axis 11 of the P.D.E.D. permits a simple construction for this axis and totally frees one of the surfaces of the P.D.E.D. The stabilizing mechanism may be moved to the right or the left, as required by the shape of the site.

Figure 3:
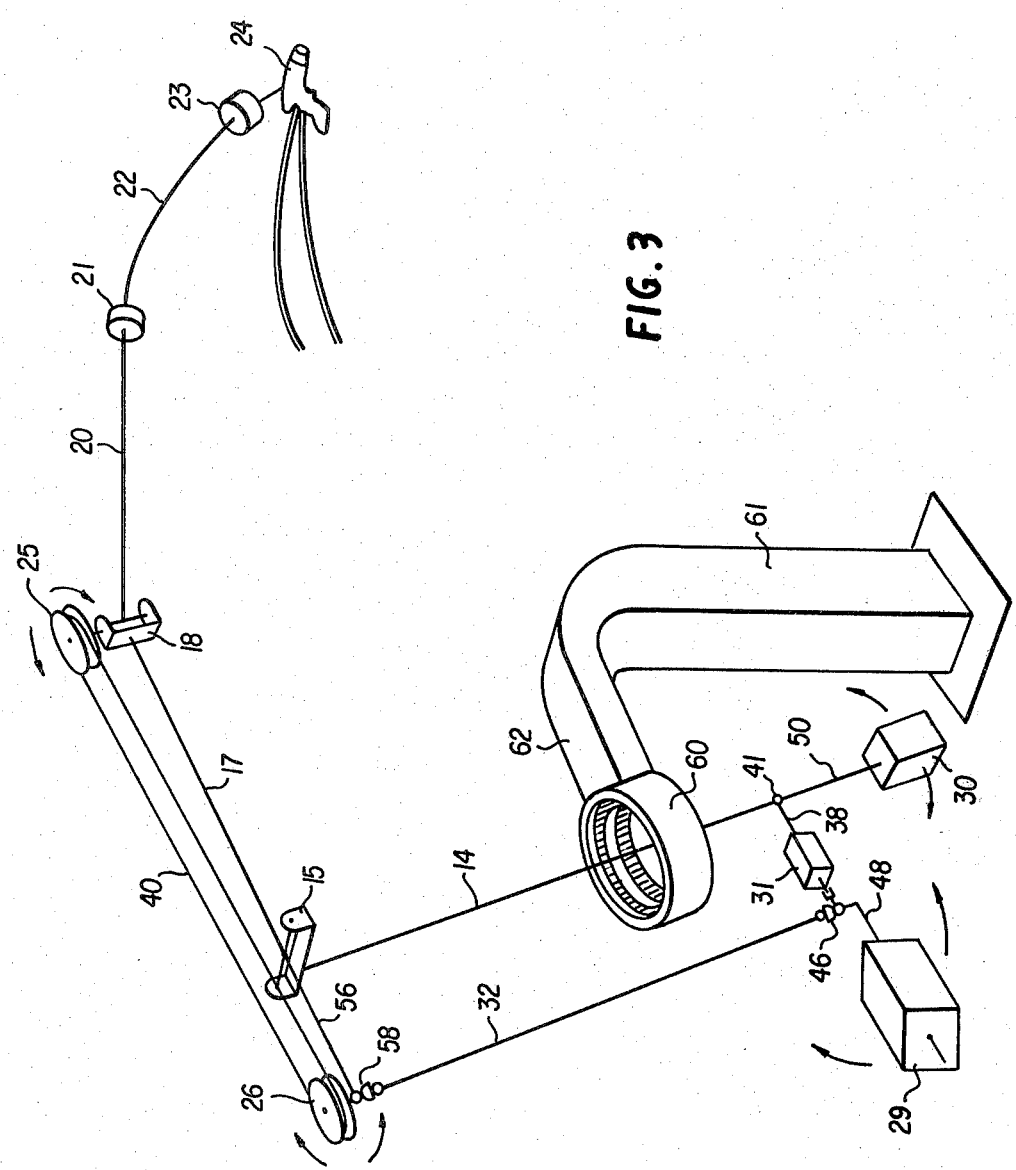
FIG. 3 represents an apprentice P.D.E.D. equipped with a third embodiment of a stabilization system according to the present invention which is located in the place of the first and second arms of the P.D.E.D.

FIG. 3 illustrates a third embodiment in which the entire P.D.E.D. structure is stabilized by elements which can be located within the plane defined by arms 14 and 17. All stress therefore occurs in the plane and this eliminates deformations of the structure transverse to said plane.

According to the embodiment shown in FIG. 3, the P.D.E.D. is supported by rotation table 61 which has the general shape of a square in section. At the end of horizontal portion 62 of the latter, first arm 14 of the P.D.E.D. swivels in ball-bearing 60. First arm 14 is extended below ball-bearing 60 by portion 50 to which counterweight 30 is attached in an adjustable manner. Second arm 17 is extended beyond pivot 15 by portion 56, at the extremity of which pulley 26 swivels by means of universal joint 58. Shaft 32 extends parallel to arm 14 of the P.D.E.D. starting at universal joint 58. The lower portion of shaft 32 swivels in universal joint 46. Counterweight 31 which balances arm 17 is supported in an adjustable position on rod 38 which rests at extremity 41 on extension 50 of arm 14 and at its second extremity on shaft 32 by means of universal joint 46. Counterweight 29 which balances arm 20 and its attachments is supported in an adjustable manner by rod 48 which, with shaft 32, forms a half square and which is rotated around shaft 32 by pulleys 25, 26 and universal joints 58 and 46. This stabilization system is very simple and is based on the formation of a single parallelogram comprising arm 14, parallel shaft 32, rod 38 and extension 56. The rotation of arm 20 around pivot 18 causes the identical rotation of stabilizing counterweight 29 around shaft 32 by the interplay of pulleys 25, 26 and universal joints 58 and 46.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A stabilization system for an apprentice pantographic daty entry device having at least six axes of rotation, said apprentice pantographic data entry device including a first vertical axis, a second horizontal axis, a first arm pivoted at one end thereof in a vertical plane, said one end of said first arm being located at the point of intersection of said first and second axes, a third horizontal axis at the other end of said first arm, a second arm pivoted in said vertical plane at one end thereof, said second arm being pivoted about the point of intersection of said first arm and said third axis, a fourth axis at the other end of said second arm;

a third arm pivoted in a plane perpendicular to said vertical plane at one end thereof, said third arm being pivoted about the end of intersection of said second arm and said fourth axis, and a polyarticulated aspirator and a gun connected to the other end of said third arm, said stabilization system comprising:

at least one partial parallelogram composed of pivoted linkages, said parallelogram being parallel to a plane defined by said first and second arms;

a plurality of counterweights attached to said pivoted linkages;

angle transmitting means incorporating said pivoted linkages and adapted to transmit the rotation of said third arm about said fourth axis to a first one of said counterweights, wherein said angle transmitting means further includes pulley means transmitting the rotation of said third arm about said fourth axis to said first one of said couterweights rotatable about a first one of said linkages which is parallel to said first arm.

2. The system of claim 1 including:

a second one of said linkages having a first portion rotating with said first arm about said second axis, and a second portion extending below said first portion and being perpendicular thereto;

a second counterweight counterbalancing said first arm and being supported on said second portion of said second linkage;

a third one of said linkages pivoted between said first and second linkages, extending parallel to said second arm, and being located below said second axis; and a third counterweight counterbalancing said second arm and located on said third linkage;

wherein said first linkage extends parallel to said second portion of said second linkage, and said first counterweight counterbalances said third arm.

3. The system of claim 2 including a fourth one of said linkages having a first portion rotating with said second arm about said third axis, and a second portion extending parallel to said second arm.

4. The system of claim 3 including first joint means connecting said first linkage, said fourth linkage and a first pulley of said pulley means, said first joint means adapted to rotatably connect said first pulley to said first linkage with the axis of said first pulley maintained parallel to said first linkage.

5. The system of claim 4 wherein said two partial parallelograms are connected to, and comprise in part, a lower linkage having a central portion extending coaxially of said second axis and perpendicular portions on each end thereof, and an upper linkage having a central portion rotating coaxially of said third axis and perpendicular portions extending in the plane defined by said second arm and said third axis.

6. The system of claim 5 wherein said first counterweight is supported by an element connected to one perpendicular portion of said lower linkage, and including a second counterweight supported on the other perpendicular portion of said lower linkage.

7. The system of claim 6 including:

a second linkage pivoted between said upper linkage and said other perpendicular portion of said lower linkage, and extending parallel to said second arm; and a third counterweight counterbalancing said second arm and supported on said second linkage.

8. The system of claim 1 including two parallel ones of said at least one partial parallelogram, said two partial parallelograms being symmetrical about said vertical plane.

9. The system of claim 1 including:

a rotation table having a base and a distal end, said distal end supporting said first and second axes;

a portion of said first arm extending below said second axis;

a second counterweight couterbalancing said first arm and located at the distal end of said extending portion of said first arm;

a second linkage extending parallel to said second arm and pivoted between a midportion of said extension of said first arm and said first linkage; and a third counterweight counterbalancing said second arm and located on said second linkage.

10. The system of claim 9 including:

a portion of said second arm extending beyond said third axis;

a pulley of said pulley means; and first joint means connecting said extending portion of said second arm, said first linkage and said pulley, said first joint means maintaining said pulley rotatably connected to, and coaxial with, said first linkage.

11. The system of claim 10 including second joint means pivotally and rotatably connecting said first and second linkages.

* * * * *